United States Patent
Mori

(10) Patent No.: US 10,081,695 B2
(45) Date of Patent: Sep. 25, 2018

(54) CROSS-LINKED RUBBER

(71) Applicant: ZEON CORPORATION, Tokyo (JP)

(72) Inventor: Kentaro Mori, Tokyo (JP)

(73) Assignee: ZEON CORPORATION, Tokyo (JP)

(*) Notice: Subject to any disclaimer, the term of this patent is extended or adjusted under 35 U.S.C. 154(b) by 43 days.

(21) Appl. No.: 15/514,580

(22) PCT Filed: Sep. 25, 2015

(86) PCT No.: PCT/JP2015/077111
§ 371 (c)(1),
(2) Date: Mar. 27, 2017

(87) PCT Pub. No.: WO2016/052335
PCT Pub. Date: Apr. 7, 2016

(65) Prior Publication Data
US 2017/0226254 A1    Aug. 10, 2017

(30) Foreign Application Priority Data

Sep. 29, 2014 (JP) ................................. 2014-198101

(51) Int. Cl.
C08C 19/22 (2006.01)
C08J 3/24 (2006.01)
C08K 5/205 (2006.01)
C08F 236/14 (2006.01)
C08F 236/12 (2006.01)

(52) U.S. Cl.
CPC ............ *C08F 236/14* (2013.01); *C08C 19/22* (2013.01); *C08F 236/12* (2013.01); *C08J 3/24* (2013.01); *C08J 2309/02* (2013.01); *C08K 5/205* (2013.01)

(58) Field of Classification Search
CPC ...... C08F 236/12; C08F 236/14; C08C 19/22; C08J 3/24; C08J 2309/02; C08K 5/205
See application file for complete search history.

(56) References Cited

U.S. PATENT DOCUMENTS

| 4,384,079 A * | 5/1983 | Lemieux ................ C08G 18/69 138/177 |
| 6,657,014 B1 | 12/2003 | Mori et al. |
| 2011/0040043 A1* | 2/2011 | Ito ......................... C07C 271/20 525/348 |
| 2013/0280459 A1* | 10/2013 | Nakashima ............. C08L 13/00 428/36.8 |

FOREIGN PATENT DOCUMENTS

JP    2001-055471 A    2/2001

OTHER PUBLICATIONS

Translation of Dec. 15, 2015 Search Report issued in International Patent Application No. PCT/JP2015/077111.

* cited by examiner

Primary Examiner — Roberto Rabago
(74) Attorney, Agent, or Firm — Oliff PLC

(57) ABSTRACT

A cross-linked rubber obtained by cross-linking a nitrile rubber composition, wherein the nitrile rubber composition contains a carboxyl group-containing nitrile rubber (a) with an iodine value of 120 or less and a diurethane compound (b) represented by a following general formula (1), a content of the diurethane compound (b) in the nitrile rubber composition is 5 to 15 parts by weight with respect to 100 parts by weight of the carboxyl group-containing nitrile rubber (a), and a tensile strength of the cross-linked rubber based on JIS K6251 is 15 MPa or more and an elongation at break of the cross-linked rubber based on JIS K6251 is 300% or more, is provided.

(1)

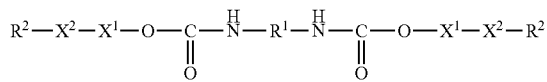

9 Claims, No Drawings

CROSS-LINKED RUBBER

TECHNICAL FIELD

The present invention relates to a cross-linked rubber excellent in constant-elongation fatigue resistance and compression set resistance.

BACKGROUND ART

Since the past, a nitrile rubber (acrylonitrile-butadiene copolymer rubber) has been used as a material for rubber parts such as hoses, and tubes for automobiles by taking advantage of its oil resistance, mechanical properties, chemical resistance, etc. Further, a hydrogenated nitrile rubber (hydrogenated acrylonitrile-butadiene copolymer rubber) obtained by hydrogenating the carbon-carbon double bonds in the polymer main chain of the nitrile rubber is further excellent in heat resistance, so is being used for rubber parts such as belts, hoses, and diaphragms.

In view of such a situation, Patent Document 1 proposes a cross-linkable nitrile rubber composition containing a hydrogenated nitrile rubber having α,β-ethylenically unsaturated dicarboxylic acid monoester monomer units, a polyamine-based cross-linking agent, and a basic cross-linking accelerator. According to the cross-linkable nitrile rubber composition disclosed in Patent Document 1, the compression set resistance is improved, but the constant-elongation fatigue resistance is not sufficient. Therefore sometimes this is not suited to use for applications in which excellent constant-elongation fatigue resistance is required, for example, hose applications.

RELATED ART

Patent Documents

Patent Document 1: Japanese Patent Publication No. 2001-55471A

SUMMARY OF INVENTION

Problem to be Solved by the Invention

The present invention was made in consideration of such an actual situation and has as its object the provision of a cross-linked rubber excellent in constant-elongation fatigue resistance and compression set resistance.

Means for Solving the Problem

The inventors engaged in intensive research to achieve the above object and as a result discovered that the above object can be achieved by a cross-linked rubber which is obtained by cross-linking a rubber composition comprising a carboxyl group-containing nitrile rubber with an iodine value of 120 or less into which a specific diurethane compound is mixed and which has a tensile strength, measured based on JIS K6251, of 15 MPa or more and an elongation at break of 300%, and thereby completed the present invention.

That is, according to the present invention, there is provided a cross-linked rubber obtained by cross-linking a nitrile rubber composition, wherein the nitrile rubber composition contains a carboxyl group-containing nitrile rubber (a) with an iodine value of 120 or less and a diurethane compound (b) represented by a following general formula (1), a content of the diurethane compound (b) in the nitrile rubber composition is 5 to 15 parts by weight with respect to 100 parts by weight of the carboxyl group-containing nitrile rubber (a), and a tensile strength of the cross-linked rubber based on JIS K6251 is 15 MPa or more and an elongation at break of the cross-linked rubber based on JIS K6251 is 300% or more:

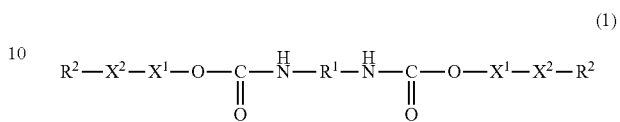

(1)

wherein, in the general formula (1), $R^1$ is a linear or branched bivalent aliphatic alkylene group having 1 to 20 carbon atoms, a bivalent alicyclic cycloalkylene group, or a bivalent aromatic group, $R^2$ is a group giving a diamine by breaking down by action of a basic compound when made a carbamate structure, $X^1$ is $—CH_2—$, $—CH_2CH_2—$, or a chemical single bond, and $X^2$ is $—SO_2—$ or a chemical single bond.

In the cross-linked rubber of the present invention, the diurethane compound (b) is preferably a compound represented by the following general formula (2), is more preferably a compound represented by the following formula (3):

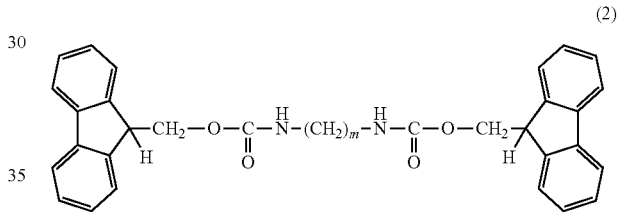

(2)

wherein, in the general formula (2), "m" is 4, 5, or 6.

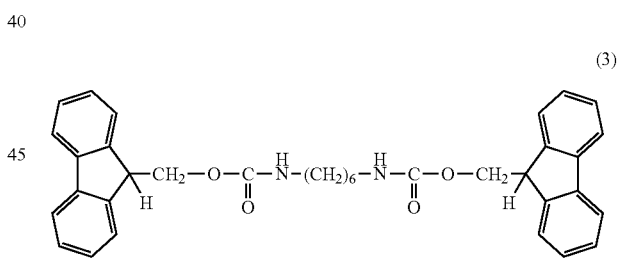

(3)

Further, in the cross-linked rubber of the present invention, preferably the carboxyl group-containing nitrile rubber (a) contains 10 to 60 wt % of α,β-ethylenically unsaturated nitrile monomer units, 0.1 to 20 wt % of carboxyl group-containing monomer units, and 20 to 89.9 wt % of conjugated diene monomer units (including also hydrogenated parts), more preferably the carboxyl group-containing monomer units are α,β-ethylenically unsaturated dicarboxylic acid monoester monomer units.

In the cross-linked rubber of the present invention, a content of the carboxyl group in the carboxyl group-containing nitrile rubber (a) is preferably $5×10^{-4}$ to $5×10^{-1}$ ephr.

In the cross-linked rubber of the present invention, a content of the diurethane compound (b) in the nitrile rubber composition is preferably 6.0 to 12 parts by weight with respect to 100 parts by weight of the carboxyl group-containing nitrile rubber (a).

In the cross-linked rubber of the present invention, the nitrile rubber composition preferably further contains a basic cross-linking accelerator (c).

Still further, according to the present invention, there is provided a hose comprised of any of the above cross-linked rubber.

Effects of Invention

According to the present invention, a cross-linked rubber excellent in constant-elongation fatigue resistance and compression set resistance is provided. The cross-linked rubber of the present invention is excellent in constant-elongation fatigue resistance and compression set resistance, so can be particularly preferably used for hose applications.

DESCRIPTION OF EMBODIMENTS

The cross-linked rubber of the present invention is obtained by cross-linking a nitrile rubber composition containing a carboxyl group-containing nitrile rubber (a) with an iodine value of 120 or less and a diurethane compound (b) represented by the following general formula (1), a content of the diurethane compound (b) being 5 to 15 parts by weight with respect to 100 parts by weight of the carboxyl group-containing nitrile rubber (a), in which a tensile strength measured based on JIS K6251 is 15 MPa or more and an elongation at break based on JIS K6251 is 300% or more.

Nitrile Rubber Composition

First, the nitrile rubber composition used for obtaining the cross-linked rubber of the present invention will be explained.

The nitrile rubber composition used in the present invention contains a carboxyl group-containing nitrile rubber (a) with an iodine value of 120 or less and a diurethane compound (b) represented by the following general formula (1) which is explained later.

Carboxyl Group-Containing Nitrile Rubber (a)

The carboxyl group-containing nitrile rubber (a) with an iodine value of 120 or less used in the present invention (below, sometimes simply referred to as a "carboxyl group-containing nitrile rubber (a)") is a rubber which is obtained by copolymerizing an α,β-ethylenically unsaturated nitrile monomer, a carboxyl group-containing monomer, and a copolymerizable other monomer added according to need and which has an iodine value of 120 or less.

The α,β-ethylenically unsaturated nitrile monomer is not particularly limited so long as an α,β-ethylenically unsaturated compound having a nitrile group. For example, acrylonitrile; α-halogenoacrylonitrile such as α-chloroacrylonitrile and α-bromoacrylonitrile; an α-alkylacrylonitrile such as methacrylonitrile; etc. may be mentioned. Among these as well, acrylonitrile and methacrylonitrile are preferable, while acrylonitrile is more preferable. The α,β-ethylenically unsaturated nitrile monomer may be used as single types alone or as a plurality of types combined.

The content of the α,β-ethylenically unsaturated nitrile monomer units is preferably 10 to 60 wt % with respect to the total monomer units, more preferably 10 to 50 wt %, still more preferably 15 to 50 wt %. By making the content of the α,β-ethylenically unsaturated nitrile monomer units the above range, the obtained cross-linked rubber can be made excellent in oil resistance and cold resistance.

The carboxyl group-containing monomer is not particularly limited so long as a monomer which can copolymerize with an α,β-ethylenically unsaturated nitrile monomer and has one or more unsubstituted (free) carboxyl groups which are not esterified or the like. By using a carboxyl group-containing monomer, it is possible to introduce a carboxyl group into the nitrile rubber.

As the carboxyl group-containing monomer used in the present invention, for example, α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, carboxyl group-containing monomer includes a monomer with a carboxyl group which forms a carboxylic acid salt. Further, anhydride of α,β-ethylenically unsaturated polyvalent carboxylic acid also can form carboxyl groups by cleavage of an acid anhydride group after copolymerization, so can be used as a carboxyl group-containing monomer.

As the α,β-ethylenically unsaturated monocarboxylic acid monomer, acrylic acid, methacrylic acid, ethylacrylic acid, crotonic acid, silicic acid, etc. may be mentioned.

As the α,β-ethylenically unsaturated polyvalent carboxylic acid monomer, butenedioic acids such as fumaric acid and maleic acid, itaconic acid, citraconic acid, mesaconic acid, glutaconic acid, allylmalonic acid, teraconic acid, etc. may be mentioned. Further, as anhydrides of α,β-unsaturated polyvalent carboxylic acid, maleic anhydride, itaconic anhydride, citraconic anhydride, etc. may be mentioned.

As the α,β-ethylenically unsaturated dicarboxylic acid monoester monomers, maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethylcyclopentyl maleate and monoethylcyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethylcyclopentyl itaconate and monoethylcyclohexyl itaconate, etc. may be mentioned.

The carboxyl group-containing monomer may be used as single types alone or as a plurality of types combined. Among these as well, since the effect of the present invention becomes much more remarkable, α,β-ethylenically unsaturated dicarboxylic acid monoester monomer is preferable, α,β-ethylenically unsaturated dicarboxylic acid monoalkyl ester monomer is more preferable, a maleic acid monoalkyl ester is still more preferable, and mono-n-butyl maleate is particularly preferable. Note that, the number of carbon atoms of the alkyl group of the alkylester is preferable 2 to 8.

The content of the carboxyl group-containing monomer units is preferably 0.1 to 20 wt % with respect to the total monomer units, more preferably 0.2 to 15 wt %, still more preferably 0.5 to 10 wt %. By making the content of the α,β-ethylenically unsaturated dicarboxylic acid monoester monomer units the above range, it is possible to make the obtained cross-linked rubber better in mechanical properties and compression set resistance.

Further, the carboxyl group-containing nitrile rubber (a) used in the present invention preferably contains conjugated diene monomer units so that the obtained cross-linked product has rubber elasticity.

As the conjugated diene monomer forming the conjugated diene monomer units, conjugated diene monomer having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiene is particularly preferable. The conjugated diene monomer may be used as single types alone or as a plurality of types combined.

The content of the conjugated diene monomer units (including also hydrogenated parts) is preferably 20 to 89.9 wt % with respect to the total monomer units, more preferably 35 to 89.8 wt %, still more preferably 40 to 84.5 wt %. By making the content of the conjugated diene monomer units the above range, the obtained cross-linked rubber can be made excellent in rubber elasticity while maintaining well its heat resistance and chemical stability.

Further, the carboxyl group-containing nitrile rubber (a) used in the present invention may contain, in addition to the α,β-ethylenically unsaturated nitrile monomer units, carboxyl group-containing monomer units, and conjugated diene monomer units, and units of other monomers copolymerizable with the monomers forming these. As such other monomers, α,β-ethylenically unsaturated monocarboxylic acid ester monomer, ethylene, α-olefin monomer, aromatic vinyl monomer, fluorine-containing vinyl monomer, copolymerizable antiaging agent, etc. may be illustrated.

As the α,β-ethylenically unsaturated monocarboxylic acid ester monomer, (meth)acrylic acid ester (abbreviation for "methacrylic acid ester and acrylic acid ester", same below) having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; (meth)acrylic acid ester having an alkoxyalkyl group having 2 to 18 carbon atoms such as methoxymethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid ester having a cyanoalkyl group having 2 to 12 carbon atoms such as α-cyanoethyl acrylate, α-cyanoethyl methacrylate, and cyanobutyl methacrylate; (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; (meth)acrylic acid ester having a fluoroalkyl group having 1 to 12 carbon atoms such as trifluoroethyl acrylate and tetrafluoropropyl methacrylate; etc. may be mentioned.

As the α-olefin monomer, one having 3 to 12 carbon atoms is preferable. For example, propylene, 1-butene, 4-methyl-1-pentene, 1-hexene, 1-octene, etc. may be mentioned.

As the aromatic vinyl monomer, styrene, α-methylstyrene, vinylpyridine, etc. may be mentioned.

As the fluorine-containing vinyl monomer, a fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be used jointly as a plurality of types. The content of the units of the other monomers is preferably 50 wt % or less with respect to the total monomer units fainting the carboxyl group-containing nitrile rubber (a), more preferably 40 wt % or less, still more preferably 10 wt % or less.

The carboxyl group-containing nitrile rubber (a) has an iodine value of 120 or less, preferably 60 or less, more preferably 40 or less, particularly preferably 30 or less. If the iodine value of the carboxyl group-containing nitrile rubber (a) is too high, the obtained cross-linked rubber is liable to fall in heat resistance and ozone resistance.

The carboxyl group-containing nitrile rubber (a) has a polymer Mooney viscosity (ML1+4, 100° C.) of preferably 10 to 200, more preferably 15 to 150, still more preferably 15 to 100, particularly preferably 30 to 70. If the polymer Mooney viscosity of the carboxyl group-containing nitrile rubber (a) is too low, the obtained cross-linked rubber is liable to fall in mechanical properties, while conversely if too high, the nitrile rubber composition may fall in processability.

Further, the content of carboxyl group in the carboxyl group-containing nitrile rubber (a), that is, the number of moles of the carboxyl group per 100 g of the carboxyl group-containing nitrile rubber (a) is preferably $5\times10^{-4}$ to $5\times10^{-1}$ ephr, more preferably $1\times10^{-3}$ to $1\times10^{-1}$ ephr, particularly preferably $5\times10^{-3}$ to $6\times10^{-2}$ ephr. By making the content of carboxyl group of the carboxyl group-containing nitrile rubber (a) the above range, it is possible to make the obtained cross-linked rubber higher in mechanical properties and compression set resistance while making the nitrile rubber composition good in scorch stability.

The method of production of the carboxyl group-containing nitrile rubber (a) used in the present invention is not particularly limited, but the method of copolymerizing the above-mentioned monomers is convenient so is preferable. As the polymerization method, any of the known emulsion polymerization method, suspension polymerization method, bulk polymerization method, and solution polymerization method can be used, but since the control of the polymerization reaction is easy, the emulsion polymerization method is preferable. Note that, when the copolymer obtained by copolymerization has an iodine value higher than 120, the copolymer may be hydrogenated (hydrogenation reaction). In this case, the method of hydrogenation is not particularly limited, but a known method may be employed.

Diurethane Compound (b)

The diurethane compound (b) used in the present invention is a compound represented by the following general formula (1). A diurethane compound (b) acts as a cross-linking agent for cross-linking the above-mentioned carboxyl group-containing nitrile rubber (a). In the present invention, by combining the diurethane compound (b) with the above-mentioned carboxyl group-containing nitrile rubber (a), the obtained cross-linked rubber can be improved in constant-elongation fatigue resistance and compression set resistance. In particular, the diurethane compound (b) used in the present invention includes the amine structure exhibiting an action as a cross-linking agent as a faint of a urethane structure so that the amine structure is protected. By having such a structure, the nitrile rubber composition can remain stable in the state before cross-linking. Also, when actually performing the cross-linking reaction, it is possible to control a cross-linked structure of the obtained cross-linked rubber at a high level. Due to this, it is believed that it contributes to the improvement of the constant-elongation fatigue resistance and compression set resistance.

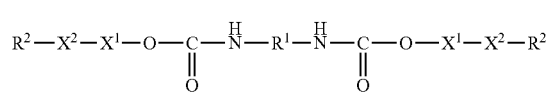

(1)

In the general formula (1), $R^1$ is a linear or branched bivalent aliphatic alkylene group having 1 to 20 carbon atoms, a bivalent alicyclic cycloalkylene group, or a bivalent aromatic group, $R^2$ is a group giving a diamine by breaking down by action of a basic compound when made a carbamate structure, $X^1$ is —$CH_2$—, —$CH_2CH_2$—, or a chemical single bond, and $X^2$ is —$SO_2$— or a chemical single bond.

In the general formula (1), $R^1$ is a linear or branched bivalent aliphatic alkylene group having 1 to 20 carbon atoms, a bivalent alicyclic cycloalkylene group, or a bivalent aromatic group. A linear or branched bivalent aliphatic alkylene group having 1 to 20 carbon atoms is preferable, a linear aliphatic alkylene group having 4 to 10 carbon atoms is more preferable, and a linear aliphatic alkylene group having 4 to 6 carbon atoms is particularly preferable.

In the general formula (1), $R^2$ is a group giving a diamine by breaking down by action of a basic compound (for example, basic cross-linking accelerator) when made a carbamate structure. This is not particularly limited so long as such a group. An alkyl group, alkoxyl group, haloalkyl group, olefin group, aryl group, or aralkyl group which have 1 to 20 carbon atoms, a fluorenyl-containing group, S-containing group, Si-containing group, N-containing group, or P-containing group is preferable. Note that, the S-containing group and N-containing group may also be an aromatic or alicyclic heterocyclic group.

As specific examples of $R^2$, a chain or alicyclic alkyl group such as a methyl group, ethyl group, propyl group, isopropyl group, diisopropylmethyl group, tert-butyl group, tert-amyl group, cyclobutyl group, cyclohexyl group, cycloheptyl group, and cyclopropylmethyl group; an alkoxyl group such as a methoxy, ethoxy, propoxy, butoxy, phenoxy, and 4-methylphenoxy; a haloalkyl group such as a 2,2,2-trichloroethyl group, 1,1-dimethyl-bromoethyl group, 1,1-dimethyl-2,2-dibromoethyl group, and 1,1-dimethyl-2,2,2-trichloroethyl group; an olefin group such as a vinyl group, allyl group, 1-isopropylallyl group, cinnamyl group, and 4-nitrocinnamyl group; an aryl group such as a phenyl group, m-nitrophenyl group, o-nitrophenyl group, 3,4-dimethoxy-6-nitrobenzyl group, phenyl(o-nitrophenyl)methyl group, benzyl group, p-methoxybenzyl group, 3,5-dimethoxybenzyl group, p-decyloxybenzyl group, p-nitrobenzyl group, p-bromobenzyl group, p-chlorobenzyl group, p-cyanobenzyl group, 2,4-dichlorobenzyl group, m-chloro-p-ethoxybenzyl group, 4-methylsulfonylbenzyl group, 2-phenylethyl group, diphenylethyl group, 1-methyl-1-(4-biphenyl)ethyl group, 1-(3,5-di-tert-butylphenyl)-1-methylethyl group, and 9-anthranylmethyl group; an aralkyl group; a fluorenyl-containing group such as a 9-fluorenylmethyl group, 9-(2-sulfo)fluorenylmethyl group, and 9-(2,7-dibromo)fluorenylmethyl group; an S-containing group such as a 2-methylthioethyl group, 2-methylsulfonylethyl group, 2-(p-toluenesulfonyl)ethyl group, 4-methylthiophenyl group, 2,4-dimethylthiophenyl group, [2-(1,3-dithianyl)]methyl group, methyldithio group, ethyldithio group, isopropyldithio group, tert-butyldithio group, phenyldithio group, 2-methylsulfonylethyl group, and 2,7-di-tert-butyl-[9-(10,10-dioxo-10,10,10,10-tetrahydrothioanyl]methyl group; an Si-containing group such as 2-trimethylsilylethyl group; an N-containing group such as a 1,1-dimethyl-2-cyanoethyl group, 2-(2'-pyridyl)ethyl group, 2-(4'-pyridyl)ethyl group, dimethyl-2-cyanoethyl group, 5-benzoyloxazolyl group, and 2-(N,N-dicyclohexylcarboxamide)ethyl group; a P-containing group such as a 2-phosphonioethyl group, 2-triphenylphosphonioisopropyl group, and 2-(triphenylphosphonio)ethyl group; etc. may be mentioned.

Among these as well, a fluorenyl-containing group is preferable, a 9-fluorenylmethyl group, 9-(2-sulfo)fluorenylmethyl group, and 9-(2,7-dibromo)fluorenylmethyl group are more preferable, and a 9-fluorenylmethyl group is more preferable.

In the general formula (1), $X^1$ is a —$CH_2$—, —$CH_2CH_2$—, or chemical single bond and is preferably a chemical single bond.

Further, in the general formula (1), $X^2$ is —$SO_2$— or a chemical single bond, preferably a chemical single bond.

That is, as the diurethane compound (b) used in the present invention, from the viewpoint of the action and effect of the present invention being made much more remarkable, a compound represented by the following general formula (2) is preferable, while 1,6-bis[(9-fluorenylmethyl)carbamate]hexane represented by the following formula (3) is particularly preferable.

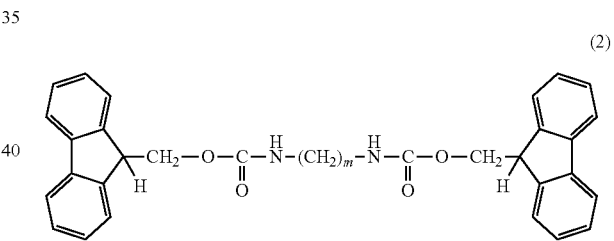

(2)

(In the general formula (2), "m" is 4, 5, or 6.)

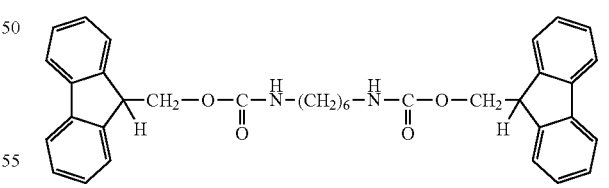

(3)

The diurethane compound (b) used in the present invention, for example, can be obtained by making a chloroformate compound represented by the following general formula (5) react with the diamine compound represented by the following general formula (4) or by making a hydroxyl group-containing compound represented by the following general formula (7) react with a diisocyanate compound represented by the following general formula (6). Note that, in the following general formulas (4) to (7), $R^1$, $R^2$, $X^1$, and $X^2$ are similar to the general formula (1).

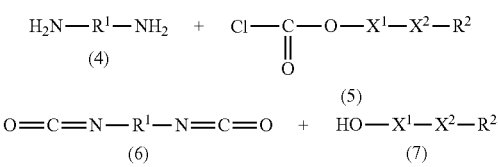

(4) $H_2N-R^1-NH_2$ + (5) $Cl-\underset{\underset{O}{\|}}{C}-O-X^1-X^2-R^2$ (6) $O=C=N-R^1-N=C=O$ + (7) $HO-X^1-X^2-R^2$ In the nitrile rubber composition used in the present invention, the amount of the diurethane compound (b) is 5 to 15 parts by weight with respect to 100 parts by weight of the carboxyl group-containing nitrile rubber (a), preferably 6.0 to 12 parts by weight, more preferably 6.5 to 10 parts by weight, particularly preferably 7.5 to 9.2 parts by weight. Both if the amount of the diurethane compound (b) is too small and if it is too large, the obtained cross-linked rubber ends up becoming inferior in constant-elongation fatigue resistance and compression set resistance.

Basic Cross-Linking Accelerator (c)

Further, the nitrile rubber composition used in the present invention preferably further contains, in addition to the above ingredients, a basic cross-linking accelerator (c). By further making it contain a basic cross-linking accelerator (c), it is possible to make the cross-linking by the diurethane compound (b) proceed more suitably. Due to this, the effect of the present invention becomes much more remarkable.

As specific examples of the basic cross-linking accelerator (c), basic cross-linking accelerators having a cyclic amidine structure such as 1,8-diazabicyclo[5,4,0]undecene-7 (below, sometimes abbreviated as "DBU"), 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; guanidine-based basic cross-linking accelerators such as tetramethylguanidine, tetraethylguanidine, diphenylguanidine, 1,3-di-o-tolylguanidine, and o-tolylbiguanide; aldehyde amine-based basic cross-linking accelerators such as n-butylaldehyde aniline and acetaldehyde ammonia; dicycloalkylamine such as dicyclopentylamine, dicyclohexylamine, and dicycloheptylamine; secondary amine-based basic cross-linking accelerators such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; etc. may be mentioned. Among these as well, a guanidine-based basic cross-linking accelerator, secondary amine-based basic cross-linking accelerator, and basic cross-linking accelerator having a cyclic amidine structure are preferable, a basic cross-linking accelerator having a cyclic amidine structure is more preferable, 1,8-diazabicyclo[5,4,0]undecene-7 and 1,5-diazabicyclo[4,3,0]nonene-5 are further preferable, and 1,8-diazabicyclo[5,4,0]undecene-7 is particularly preferable. Note that, the basic cross-linking accelerator having a cyclic amidine structure may form a salt with an organic carboxylic acid, alkyl phosphoric acid, etc. Further, the secondary amine-based basic cross-linking accelerator may be one mixed with an alkyleneglycol or alcohols such as an alkylalcohol having 5 to 20 carbon atoms and may be one further containing inorganic acids and/or organic acids. Further, it is also possible for the secondary amine-based basic cross-linking accelerator and the inorganic acid and/or organic acid to form a salt and further form a composite with the alkyleneglycol.

When mixing in the basic cross-linking accelerator (c), the amount in the nitrile rubber composition is preferably 0.1 to 20 parts by weight with respect to 100 parts by weight of the carboxyl group-containing nitrile rubber (a), more preferably 0.2 to 15 parts by weight, still more preferably 0.5 to 10 parts by weight. By making the amount of basic cross-linking accelerator (c) the above range, it is possible to make the nitrile rubber composition better in cross-linkability and possible to further raise the effect of the present invention.

Further, the nitrile rubber composition used in the present invention may have blended into it, in addition to the above, other compounding agents which are usually used in the field of rubber processing, for example, a cross-linking accelerator other than the basic cross-linking accelerator (c), a filler, cross-linking aid, cross-linking retarder, antiaging agent, antioxidant, photostabilizer, silane coupling agent, a scorch preventer such as a primary amine, a plasticizer, processing aid, slip agent, tackifier, lubricant, flame retardant, antifungal agent, acid acceptor, antistatic agent, coloring agent, etc. The amounts of these compounding agents are not particularly limited so long as in ranges not impairing the object or effects of the present invention. As the amounts of these compounding agents, amounts according to the purposes of inclusion may be suitably employed.

Furthermore, the nitrile rubber composition used in the present invention may contain other rubber besides the above-mentioned carboxyl group-containing nitrile rubber (a) in a range where the effects of the present invention are not obstructed.

As such a rubber, an acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluororubber, natural rubber and polyisoprene rubber etc. may be mentioned.

In the case of blending in rubber other than the carboxyl group-containing nitrile rubber (a), the amount in the nitrile rubber composition is preferably 30 parts by weight or less with respect to 100 parts by weight or less of the carboxyl group-containing nitrile rubber (a), more preferably 20 parts by weight or less, still more preferably 10 parts by weight or less.

The nitrile rubber composition used in the present invention is prepared by mixing the above ingredients in a preferably nonaqueous system. The method of preparing the nitrile rubber composition is not limited, but usually it can be prepared by kneading the ingredients other than the diurethane compound (b) and cross-linking accelerator etc. unstable against heat by a mixing machine such as a Bambury mixer, internal mixer, or kneader for primary kneading, then transferring the mixture to open rolls etc. and adding the diurethane compound (b) and cross-linking accelerator etc. unstable against heat for secondary kneading or can be prepared by kneading all of the ingredients by open rolls.

Cross-Linked Rubber

The cross-linked rubber of the present invention is a cross-linked rubber obtained by cross-linking the above-mentioned nitrile rubber composition.

The cross-linked rubber of the present invention has a tensile strength, measured based on JIS K6251, of 15 MPa or more, preferably 17 MPa or more, more preferably 19 MPa or more. Further, the cross-linked rubber of the present invention has an elongation at break based on JIS K6251 of 300% or more, preferably 350% or more, more preferably 400% or more. In the present invention, by using the above-mentioned nitrile rubber composition and making the tensile strength 15 MPa or more and elongation at break 300% or more, it is possible to make the cross-linked rubber excellent in both constant-elongation fatigue resistance and compression set resistance. If the tensile strength is less than 15 MPa or if the elongation at break is less than 300%, the cross-linked rubber ends up inferior in both constant-elongation fatigue resistance and compression set resistance. Note that, the upper limit of the tensile strength is not particularly limited, but is usually 30 MPa or less. Further, the upper limit of the elongation at break is not particularly limited, but is usually 600% or less.

The cross-linked rubber of the present invention can be produced by using the above-mentioned nitrile rubber composition, shaping it by a shaping machine corresponding to the desired shape, for example, an extruder, injection molding machine, press, rolls, etc., heating it to cause a cross-linking reaction, then fixing the shape as cross-linked rubber. In this case, the composition can be shaped in advance, then cross-linked or may be shaped and simultaneously cross-linked. As the heating method, a general method used for cross-linking rubber such as press heating, steam heating, oven heating, and hot air heating may be suitably selected.

Note that, in the present invention, the method of making the tensile strength of the cross-linked rubber 15 MPa or more and making the elongation at break 300% or more is not particularly limited, but these can be controlled by the method of adjusting the polymer Mooney viscosity of the carboxyl group-containing nitrile rubber (a) (for example, the method of adjusting the polymer Mooney viscosity of the carboxyl group-containing nitrile rubber (a) in the above-mentioned range), the method of adjusting the content of carboxyl group in the carboxyl group-containing nitrile rubber (a) (for example, the method of adjusting the content of carboxyl group in the carboxyl group-containing nitrile rubber (a) in the above-mentioned range), and further the method of adjusting the cross-linking conditions when cross-linking the above-mentioned nitrile rubber composition (cross-linking time, cross-linking temperature, etc.)

For example, as the cross-linking conditions when cross-linking the above-mentioned nitrile rubber composition, while depending on the type or amount of the diurethane compound (b) which is used, the type or amount of the other compounding agents which are used, etc., from the viewpoint of making the tensile strength of the cross-linked rubber 15 MPa or more and the elongation at break 300% or more, the cross-linking temperature is preferably 120 to 200° C., more preferably 150 to 180° C., while the cross-linking time is preferably 10 to 30 minutes, more preferably 15 to 25 minutes. Further, when secondary cross-linking is further required due to the shape, size, etc. of the cross-linked rubber, the cross-linking temperature of the secondary cross-linking is preferably 100 to 200° C., more preferably 150 to 180° C., while the cross-linking time of the secondary cross-linking is preferably 2 to 48 hours, more preferably 4 to 24 hours.

The thus obtained cross-linked rubber of the present invention is excellent in constant-elongation fatigue resistance and compression set resistance and can be preferably used for applications in which such properties are particularly demanded, specifically various hose applications such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines, in particular it can be suitably used for fuel hose applications.

EXAMPLES

Below, examples and comparative examples will be given to specifically explain the present invention. Below, unless otherwise indicated, "parts" are based on weight. Further, the tests and evaluations were conducted as follows.

Iodine Value

The iodine value of the carboxyl group-containing nitrile rubber was measured based on JIS K 6235.

Content of Carboxyl Group

To 0.2 g of 2 mm square piece of carboxyl group-containing nitrile rubber, 100 ml of 2-butanone was added. The mixture was stirred for 16 hours, then 20 ml of ethanol and 10 ml of water were added. While stirring, using a 0.02N hydrous ethanol solution of potassium hydroxide, titration was performed at room temperature using Thymol Phthalein as an indicator to find the number of moles of carboxyl group with respect to 100 g of rubber (units: ephr).

Composition of Carboxyl Group-Containing Nitrile Rubber

The ratio of content of monomer units fainting the carboxyl group-containing nitrile rubber was measured by the following method.

That is, the ratio of content of the mono-n-butyl maleate units was calculated by finding the number of moles of carboxyl group with respect to 100 g of the carboxyl group-containing nitrile rubber after hydrogenation by the above method of measurement of "content of carboxyl group" and converting the number of moles which was found to the amount of mono-n-butyl maleate units.

The ratio of content of 1,3-butadiene units (including hydrogenated parts) was calculated by measuring the iodine value of the carboxyl group-containing nitrile rubber before the hydrogenation reaction by the above method.

The ratio of content of the acrylonitrile units was calculated by measuring the nitrogen content in the carboxyl-containing nitrile rubber after hydrogenation by the Kjeldahl method in accordance with JIS K6384.

Mooney Viscosity

The Mooney viscosity (polymer Mooney) of the carboxyl group-containing nitrile rubber was measured in accordance with JIS K6300 (units: [ML1+4, 100° C.]).

Original State Physical Properties (Tensile Strength, Elongation at Break, Hardness)

The nitrile rubber composition was placed in a vertical 15 cm, horizontal 15 cm, depth 0.2 cm mold and press-famed at 170° C. for 20 minutes while pressing at a press pressure of 10 MPa to obtain sheet-shaped cross-linked rubber. Next, the obtained cross-linked rubber was transferred to a gear oven to be secondarily cross-linked at 170° C. for 4 hours, then the obtained sheet-shaped cross-linked rubber was punched by a JIS No. 3 type dumbbell shaped cutter to prepare a test piece. Further, the obtained test piece was used in accordance with JIS K6251 to measure the cross-linked rubber for tensile strength and elongation at break. Further, in accordance with JIS K6253, a Durometer hardness tester (type A) was used to measure the hardness of the cross-linked rubber.

Constant-elongation Fatigue Test

Sheet-shaped cross-linked rubber obtained in the same way as the above evaluation of original state physical properties was punched by a JIS No. 3 dumbbell shaped cutter to prepare test pieces. Further, the obtained test pieces were tested using a flex fatigue tester prescribed in JIS K6260. The test pieces were repeatedly flexed at 23° C. by 300 cycles per minute so that the test pieces were given 0 to 100% elongation. The number of cycles until the test pieces broke was measured. Note that, the test was conducted on five test pieces. The average of the results for the five test pieces was made the measurement result (number of cycles until the test pieces broke). The larger the number of cycles until break, the better the constant-elongation fatigue resistance.

Compression Set (Disk Compression Set)

Using a mold, a nitrile rubber composition was cross-linked by pressing at a temperature of 170° C. for 20 minutes to obtain diameter 29 mm, height 12.5 mm columnar cross-linked rubber. Next, the obtained cross-linked rubber was heated in a gear oven under conditions of 170° C. for 4 hours to cause secondary cross-linking and thereby obtain a columnar test piece. Further, the obtained test piece was tested in accordance with JIS K6262 by compressing the test piece by 25%, allow it to stand in a 150° C. environment for 168 hours, then measuring the compression set (disk compression set). The smaller this value, the better the compression set resistance.

Compression Set (O-Ring Compression Set)

Using an outside diameter 30 mm, ring diameter 3 mm mold, a nitrile rubber composition was cross-linked at 170° C. for 20 minutes by a press pressure of 10 MPa, then was secondarily cross-linked at 170° C. for 4 hours to obtain an O-ring-shaped test piece. Further, the obtained O-ring-shaped test piece was held at 150° C. for 168 hours in a state with the distance between two flat surfaces sandwiching the O-ring shaped test piece compressed 25% in the ring thickness direction. Under these conditions, the compression set (O-ring compression set) was measured in accordance with JIS K6262. The smaller this value, the better the compression set resistance.

Synthesis Example 1

Production of Carboxyl Group-Containing Highly Saturated Nitrile Rubber (a-1)

To a metal bottle, 180 parts of ion exchanged water, 25 parts of a concentration 10 wt % sodium dodecylbenzene sulfonate aqueous solution, 37 parts of acrylonitrile, 6 parts of mono-n-butyl maleate, and 0.75 part of t-dodecylmercaptan (molecular weight adjuster) were charged in this order. The inside gas was replaced with nitrogen three times, then 57 parts of 1,3-butadiene was charged. The metal bottle was held at 5° C., 0.1 part of cumen hydroperoxide (polymerization initiator) was charged, then the metal bottle was made to rotate while causing a polymerization reaction for 16 hours. After that, 0.1 part of a concentration 10 wt % hydroquinone aqueous solution (polymerization terminator) was added to stop the polymerization reaction, the content of the metal bottle was transferred to a glass flask, then a water temperature 60° C. rotary evaporator was used to remove the residual monomers under reduced pressure and obtain a latex of an acrylonitrile-butadiene-mono-n-butyl maleate copolymer rubber (solid content concentration about 30 wt %).

Next, to an autoclave, a palladium catalyst (solution of 1 wt % palladium acetate acetone solution and equal weight of ion exchanged water mixed together) was added to give a content of palladium of 1000 ppm with respect to the weight of the rubber contained in the latex obtained above. A hydrogenation reaction was performed at a hydrogen pressure of 3 MPa and a temperature of 50° C. for 6 hours to obtain a latex of the carboxyl group-containing highly saturated nitrile rubber (a-1). Further, to the obtained latex, two volumes of methanol were added to coagulate it, then this was filtered to take out the solid product (crumbs). This was dried in vacuo at 60° C. for 12 hours to obtain a carboxyl group-containing highly saturated nitrile rubber (a-1).

The obtained carboxyl group-containing highly saturated nitrile rubber (a-1) had an iodine value of 10, a content of carboxyl group of $3.2 \times 10^{-2}$ ephr, and a polymer Mooney viscosity (ML1+4, 100° C.) of 45. Further, the composition of the carboxyl group-containing highly saturated nitrile rubber (A-1) was 36 wt % of acrylonitrile units, 58.5 wt % of butadiene units (included hydrogenated units), and 5.5 wt % of mono-n-butyl maleate units.

Example 1

Using a Bambury mixer, to 100 parts of the carboxyl group-containing highly saturated nitrile rubber (a-1) obtained in Synthesis Example 1, 40 parts of FEF carbon black (product name "Seast SO", made by Tokai Carbon), 5 parts of tri-2-ethylhexyl trimellitate (product name "ADK Cizer C-8", made by Adeka, plasticizer), 1.5 parts of 4,4'-di-(α,α-dimethylbenzyl) diphenylamine (product name "Nocrac CD", made by Ouchi Shinko Chemical Industrial, antiaging agent), 1 part of stearic acid, and 1 part of polyoxyethylenealkyl ether phosphoric acid ester (product name "Phosphanol RL210", made by Toho Chemical Industry, processing aid) were added and mixed at 50° C. for 5 minutes. Next, the obtained mixture was transferred to 50° C. rolls and 8.3 parts of 1,6-bis[(9-fluorenylmethyl)carbamate]hexane (compound represented by the above formula (3)) and 4 parts of 1,8-diazabicyclo[5,4,0]-undecene-7 (DBU) (product name "RHENOGRAN XLA-60 (GE2014)", made by RheinChemie, DBU 60% (including part forming zinc dialkyl diphosphate), basic cross-linking accelerator) were mixed and kneaded to obtain the nitrile rubber composition.

Further, using the obtained nitrile rubber composition, the above-mentioned methods were used to preform tests and measurements of an original state physical properties (tensile strength, elongation at break, and hardness), constant-elongation fatigue test and compression set (disk compression set and O-ring compression set). The results are shown in Table 1.

Example 2

Except for changing the amount of 1,6-bis[(9-fluorenylmethyl)carbamate]hexane from 8.3 parts to 6.6 parts, the same procedure was followed as in Example 1 to prepare a nitrile rubber composition and the same procedures were followed to test and evaluate it. The results are shown in Table 1.

Example 3

Except for changing the amount of 1,6-bis[(9-fluorenylmethyl)carbamate]hexane from 8.3 parts to 10 parts, the same procedure was followed as in Example 1 to prepare a nitrile rubber composition and the same procedures were followed to test and evaluate it. The results are shown in Table 1.

Comparative Example 1

Except for changing the amount of the 1,6-bis[(9-fluorenylmethyl)carbamate]hexane from 8.3 parts to 4 parts and changing the amount of 1,8-diazabicyclo[5,4,0]-undecene-7 (DBU) from 4 parts to 1 part, the same procedure was followed as in Example 1 to prepare a nitrile rubber composition and the same procedures were followed to test and evaluate it. The results are shown in Table 1.

Comparative Example 2

Except for using, as the cross-linking agent, instead of 8.3 parts of 1,6-bis[(9-fluorenylmethyl)carbamate]hexane, 2.4 parts of hexamethylenediamine carbamate (product name "Diak#1", made by Dupont), the same procedure was followed as in Example 1 to prepare a nitrile rubber composition and the same procedures were followed to test and evaluate it. The results are shown in Table 1.

Comparative Example 3

Except for using, as the cross-linking agent, instead of 8.3 parts of 1,6-bis[(9-fluorenylmethyl)carbamate]hexane, 1.2 parts of hexamethylenediamine carbamate (product name "Diak#1", made by Dupont), the same procedure was followed as in Example 1 to prepare a nitrile rubber composition and the same procedures were followed to test and evaluate it. The results are shown in Table 1.

As shown in Table 1, the cross-linked rubber which was obtained by cross-linking a nitrile rubber composition comprising a carboxyl group-containing nitrile rubber (a) with an iodine value of 120 into which a predetermined amount of diurethane compound (b) was blended and which had a tensile strength, measured based on JIS K6251, of 15 MPa or more and an elongation at break, measured based on JIS K6251, of 300% or more had a number of cycles until break at a constant-elongation fatigue test of over 100,000 cycles in each case, was excellent in constant-elongation fatigue resistance, was low in both disk compression set and O-ring compression set, and was excellent in compression set resistance (Example 1 to 3).

On the other hand, if the amount of the diurethane compound (b) is too small, the obtained cross-linked rubber was inferior in compression set resistance (Comparative Example 1).

Further, when using, as a cross-linking agent, hexamethylenediamine carbamate instead of the diurethane compound (b), if making the amount relatively larger, the number of cycles until break at a constant-elongation fatigue test became less than 100,000 and the constant-elongation fatigue resistance became inferior (Comparative Example 2). Further, if making the amount relatively small, the tensile strength became low and the compression set resistance became inferior (Comparative Example 3). Note that, for example, in Comparative Example 2, the amount of use of hexamethylenediamine carbamate is made 2.4 parts, this amount can be made to be the same extent as Example 1 when considering the ratio of amine structures exhibiting action as a cross-linking agent.

The invention claimed is:

1. A cross-linked rubber obtained by cross-linking a nitrile rubber composition, wherein
the nitrile rubber composition contains a carboxyl group-containing nitrile rubber (a) with an iodine value of 120 or less and a diurethane compound (b) represented by a following general formula (1),
a content of the diurethane compound (b) in the nitrile rubber composition is 5 to 15 parts by weight with respect to 100 parts by weight of the carboxyl group-containing nitrile rubber (a), and

TABLE 1

| | Examples | | | Comparative examples | | |
|---|---|---|---|---|---|---|
| | 1 | 2 | 3 | 1 | 2 | 3 |
| Composition of nitrile rubber composition | | | | | | |
| Carboxyl group-containing nitrile rubber (a-1) (parts) | 100 | 100 | 100 | 100 | 100 | 100 |
| FEF carbon black (parts) | 40 | 40 | 40 | 40 | 40 | 40 |
| Tri-2-ethylhexyl trimellitate (parts) | 5 | 5 | 5 | 5 | 5 | 5 |
| 4,4'-di-(α, α-dimethylbenzyl)diphenylamine (parts) | 1.5 | 1.5 | 1.5 | 1.5 | 1.5 | 1.5 |
| Stearic acid (parts) | 1 | 1 | 1 | 1 | 1 | 1 |
| 1,6-bis[(9-fluorenylmethyl)carbamate]hexane (parts) | 8.3 | 6.6 | 10 | 4 | | |
| Hexamethylenediamine carbamate (parts) | | | | | 2.4 | 1.2 |
| 1,8-diazabicyclo[5,4,0]-undecene-7 60% product (parts) | 4 | 4 | 4 | 1 | 4 | 4 |
| Tensile strength (MPa) | 21 | 21 | 20 | 10 | 20 | 10 |
| Elongation at break (%) | 420 | 450 | 400 | 600 | 240 | 450 |
| Hardness (Duro A) | 69 | 69 | 69 | 68 | 69 | 66 |
| Constant-elongation fatigue test (cycles until break)* (cycles) | 100,000 cycles or more | 100,000 cycles or more | 100,000 cycles or more | 100,000 cycles or more | 11000 | 100,000 cycles or more |
| Compression set (Disk shape) (%) | 16 | 17 | 17 | 25 | 13 | 25 |
| Compression set (O-ring shape) (%) | 36 | 37 | 36 | 45 | 36 | 50 |

*Constant-elongation fatigue test (No. 3 dumbbell shaped cutter, elongation 100%, 300 rpm, 23° C., n = 5 average)

a tensile strength of the cross-linked rubber based on JIS K6251 is 15 MPa or more and an elongation at break of the cross-linked rubber based on JIS K6251 is 300% or more:

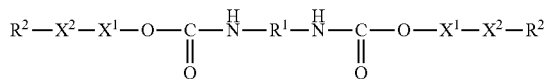
(1)

wherein, in the general formula (1), $R^1$ is a linear or branched bivalent aliphatic alkylene group having 1 to 20 carbon atoms, a bivalent alicyclic cycloalkylene group, or a bivalent aromatic group, $R^2$ is a group giving a diamine by breaking down by action of a basic compound when made a carbamate structure, $X^1$ is —CH$_2$—, —CH$_2$CH$_2$—, or a chemical single bond, and $X^2$ is —SO$_2$— or a chemical single bond.

2. The cross-linked rubber according to claim 1, wherein the diurethane compound (b) is a compound represented by the following general formula (2):

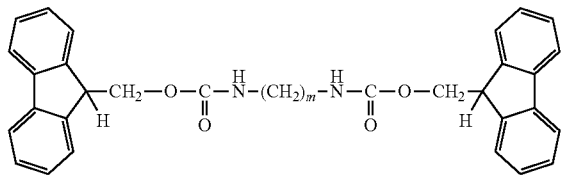
(2)

wherein, in the general formula (2), "m" is 4, 5, or 6.

3. The cross-linked rubber according to claim 2, wherein the diurethane compound (b) is a compound represented by the following general formula (3).

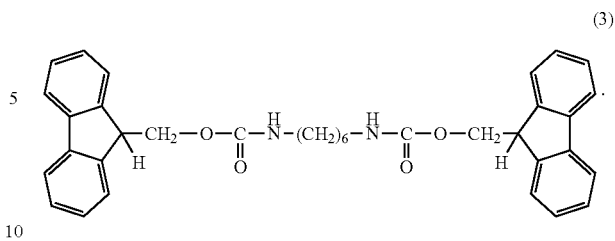
(3)

4. The cross-linked rubber according to claim 1, wherein the carboxyl group-containing nitrile rubber (a) contains 10 to 60 wt % of α,β-ethylenically unsaturated nitrile monomer units, 0.1 to 20 wt % of carboxyl group-containing monomer units, and 20 to 89.9 wt % of conjugated diene monomer units (including also hydrogenated parts).

5. The cross-linked rubber according to claim 4, wherein the carboxyl group-containing monomer units are α,β-ethylenically unsaturated dicarboxylic acid monoester monomer units.

6. The cross-linked rubber according to claim 1, wherein a content of the carboxyl group in the carboxyl group-containing nitrile rubber (a) is $5\times10^{-4}$ to $5\times10^{-1}$ ephr.

7. The cross-linked rubber according to claim 1, wherein a content of the diurethane compound (b) in the nitrile rubber composition is 6.0 to 12 parts by weight with respect to 100 parts by weight of the carboxyl group-containing nitrile rubber (a).

8. The cross-linked rubber according to claim 1, wherein the nitrile rubber composition further contains a basic cross-linking accelerator (c).

9. A hose comprising a cross-linked rubber according to claim 1.

* * * * *